United States Patent [19]

Orain

[11] Patent Number: 4,619,628
[45] Date of Patent: Oct. 28, 1986

[54] ARRANGEMENT OF TWO ELEMENTS WHICH UNDERGO AN ALTERNATING SLIDING MOTION AND ITS APPLICATION IN A SLIDABLE TRIPOD JOINT

[75] Inventor: Michel A. Orain, Conflans Sainte Honorine, France

[73] Assignee: Glaenzer Spicer, France

[21] Appl. No.: 664,070

[22] Filed: Oct. 23, 1984

[30] Foreign Application Priority Data

Nov. 4, 1983 [FR] France .................... 83 17578

[51] Int. Cl.⁴ .................... F16D 3/20; F16F 15/00
[52] U.S. Cl. .................... 464/111; 267/150; 464/167; 464/905; 384/50
[58] Field of Search .................... 267/150, 166, 171, 174; 308/3.8, 6 R; 464/111, 120, 122, 132, 162, 167, 905

[56] References Cited

U.S. PATENT DOCUMENTS

| | | | |
|---|---|---|---|
| 2,371,330 | 3/1945 | Irstad | 464/167 X |
| 4,075,872 | 2/1978 | Geisthoff | 464/167 |
| 4,438,660 | 3/1984 | Kittle | 267/150 X |
| 4,458,549 | 7/1984 | Tani et al. | 267/150 X |

FOREIGN PATENT DOCUMENTS

| | | | |
|---|---|---|---|
| 2476251 | 8/1981 | France . | |
| 55-51119 | 4/1980 | Japan | 308/6 R |
| 1023634 | 3/1966 | United Kingdom . | |
| 2033496 | 5/1980 | United Kingdom . | |
| 2099551 | 12/1982 | United Kingdom | 464/111 |

Primary Examiner—Stuart S. Levy
Assistant Examiner—Daniel P. Stodola
Attorney, Agent, or Firm—Wenderoth, Lind & Ponack

[57] ABSTRACT

There is provided between a needle plate (9, 10) and a slide (6) which is interposed between a trunnion and a track a return spring (14) formed by a wire of resilient metal having at least one coil (C) which surrounds the slide and two end portions (14b) of the wire which are hooked to the needle plate. This spring operates under bending and compressive stress in its mean plane.

7 Claims, 6 Drawing Figures

ARRANGEMENT OF TWO ELEMENTS WHICH UNDERGO AN ALTERNATING SLIDING MOTION AND ITS APPLICATION IN A SLIDABLE TRIPOD JOINT

The present invention relates to arrangements of the type in which two elements between which are disposed rolling members maintained in position by a cage, undergo with respect to each other an alternating sliding motion. The rolling members may be needles and, in this case, the assembly formed by the needles and their cage is designated by the term "needle plate". Such needle plates eliminate friction and wear and can operate without clearance. They are practically essential when large loads are to be transmitted to parts undergoing a rapid continuous alternating motion, as in the case of slidable tripod joints operating at an angle.

In such arrangements, when the alternating motion has a variable amplitude, there is a problem of the centering of the row of needles which, in theory, is moved to an extent equal to one half of the relative displacement of these two elements. This problem results from the fact that, in operation, the ring arrangement of needles maintained in contact with one another by their cage, becomes off center or offset progressively in one direction or the other until a limit of travel determined by a mechanical abutment is reached. At this moment, there occurs an impact and a sliding under load which are of course harmful and which are the opposite of what is desired.

In a known arrangement (FR-A 2 476 251), the cage is maintained with respect to one of the two elements by two coil springs disposed respectively between one side of this element and one of the ends of the cage. Each spring undergoes a deflection in the conventional manner along its central axis. Such an arrangement is space consuming and relatively complicated, in particular due to the fact of the difficulty of finding hooking points on the movable element.

An object of the invention is therefore to provide a resiliently yieldable return device which is reliable, easy to mount and if of a very small overall size and cost. Further, in particular in the application in slidable homokinetic joints, this resiliently yieldable return device must never compromise the very free sliding and the neutrality of the joint.

The invention therefore provides an arrangement of two elements which undergo with respect to each other an alternating sliding motion, between which are disposed rolling members maintained in position by a cage, at least one return spring disposed between the cage and one of said elements, wherein the spring, which is made from a resiliently yieldable metal wire, forms at least one coil surrounding said element and two portions whose ends are respectively connected to the cage on each side of said element.

According to other features:

the spring is bent and compressed in its mean plane parallel to the plane of the or each coil;

the spring is a coil spring of the type having contacting coils, the ends of which are spread apart so as to be hooked to the cage;

the spring is hooked to two pins rigid with the cage which also perform the function of stops limiting the relative motion between the cage and said element.

The invention will be described in more detail hereinafter with reference to the accompanying drawings which are given solely by way of example and in which.

Figure 1:
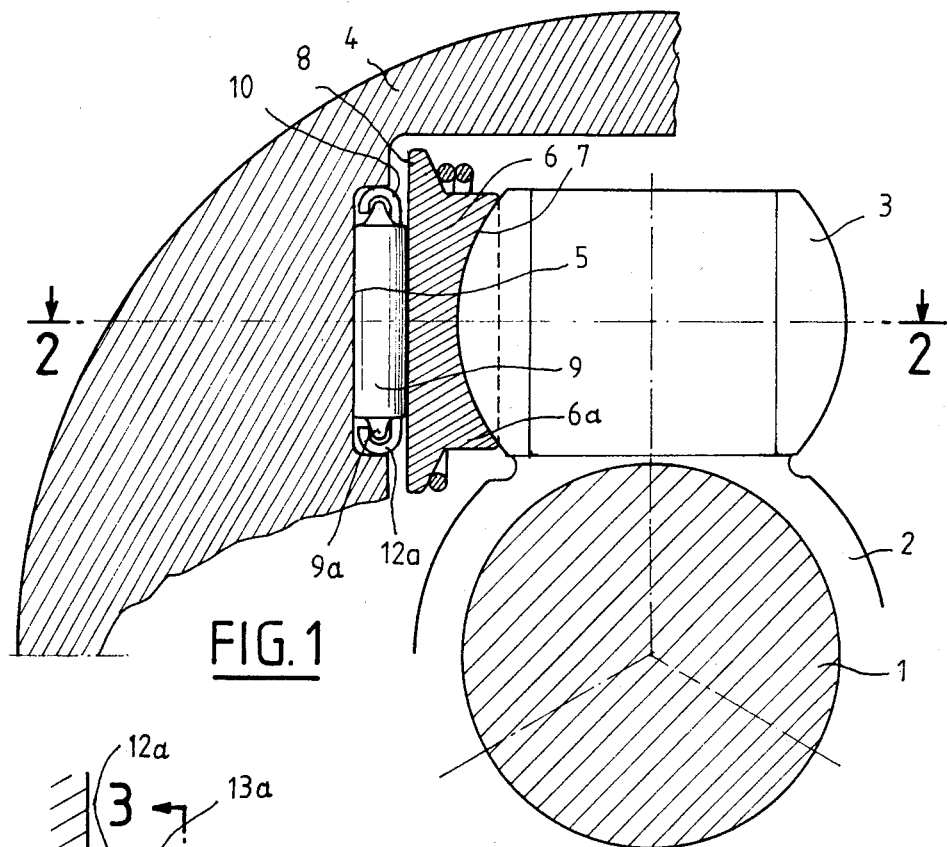
FIG. 1 is a partial sectional view of a tripod joint provided with a return device according to the invention.

In the following embodiments, the invention is assumed to be applied to a slidable homokinetic joint of the tripod type, which may be interposed for example between a drive shaft (not shown) and a transmission shaft 1. The joint comprises a tripod element 2 rigid with the transmission shaft and defining three trunnions 3 of spherical shape which are evenly spaced apart around the axis of the transmission shaft. The other part of the joint is formed by a barrel 4 rigid with the drive shaft and defining planar raceways, two parallel raceways being associated with a common trunnion. For reasons of simplification, the drawing shows only a single trunnion 3 and a single raceway 5 of the barrel.

Disposed between each trunnion 3 and an planar raceway 5 is a slide or bush 6 defining, on one side, a concave spherical bearing surface 7 in which the adjacent convex surface of the trunnion slides and, on the other side, a planar surface or a roughly planar surface 8 which extends in a direction parallel to the raceway 5.

This slide moreover has a roughly cylindrical body 6a.

Disposed between the confronting two surfaces of the slide and raceway is a row of needles 9 which are maintained in position by a cage or plate 10. This plate has a generally rectangular shape and includes a central opening 11 in which the needles are disposed and which is defined by two flanges 12a which extend along the two large sides of the rectangle, in which flanges the ends 9a of the needles are received (FIG. 1) and two flanges 12b which extend along the small sides of the rectangle (FIG. 2). Further, the plate defines at its two ends two lugs 13 which extend in a direction roughly perpendicular to the surface of this plate on the side thereof facing toward the bush and the tripod. Hooked on these lugs are the ends of a return spring 14 formed by a coil spring having contacting coils and made from a wire of a resilient metal. In the embodiment shown in FIGS. 1 to 3, this spring has a generally flat configuration with a mean plane parallel to the raceway 5 and defines a single coil 14a which surrounds the body 6a of the bush 6 and extends on each side of this slide or bush in the form of two end arm portions 14b whose ends 14c are hooked to the lugs 13.

Figure 3:
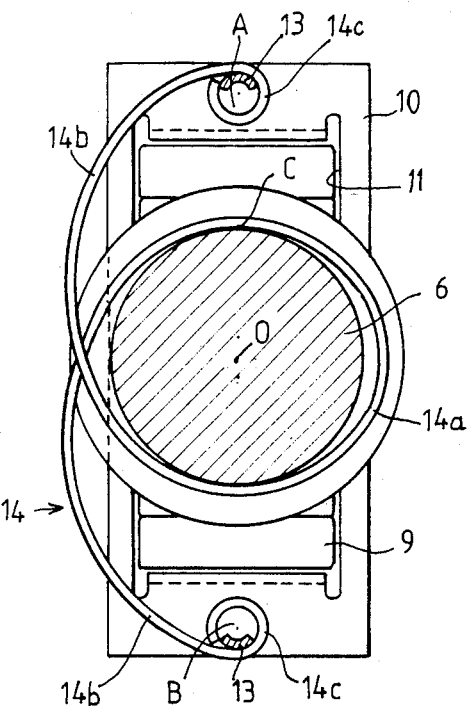
FIG. 3 is a sectional view taken along line 3—3 of FIG. 2.

With reference to FIG. 3, it can be seen that this return device operates in the following manner:

When the center O of the slide moves toward the point of attachment A, it bears at C on the coil of the spring. The arc of this spring between C and B which extends at angle at the center of about 180°, resiliently opens and exerts at the point C a force in the direction of B. Further, the arc of this spring between C and A, and which extends an angle at the center of about 360°, resiliently closes and exerts at the point C a force also in the direction of B. The combined actions of the whole of the spring therefore tend to constantly re-center the plate and the row of needles relative to the slide.

This return device is very simple and of very small size. Its mounting presents no difficulty, on the contrary, since a secondary but important advantage of this device is that it retains the assembly formed by the slide and the plate carrying the needles, which facilitates the assembly by the fact that it enables sub-assemblies to be formed which comprise the plate, the needles, the slide and the return spring.

Note also that at the end of the travel of the slide, the base 13a of the lug 13 acts as a safety stop for avoiding the loss of the slide when accidental extreme movements of the sliding joint occur.

Figure 2:
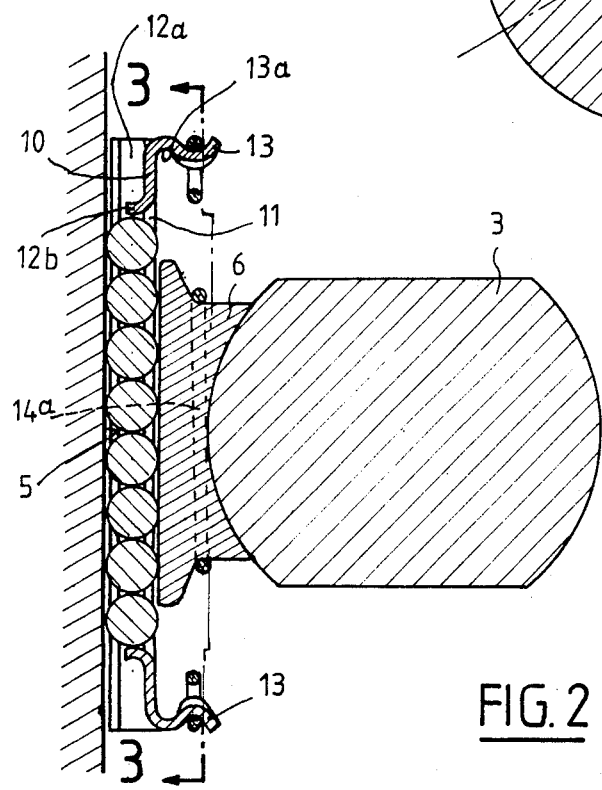
FIG. 2 is a sectional view taken along line 2—2 of FIG. 1.
Figure 6:
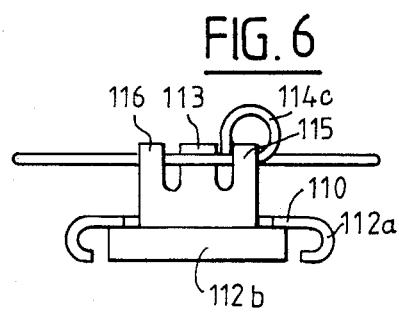
FIG. 6 is a side elevational view of the assembly formed by the cage and the return spring in the embodiment shown in FIGS. 4 and 5.
Figure 4:
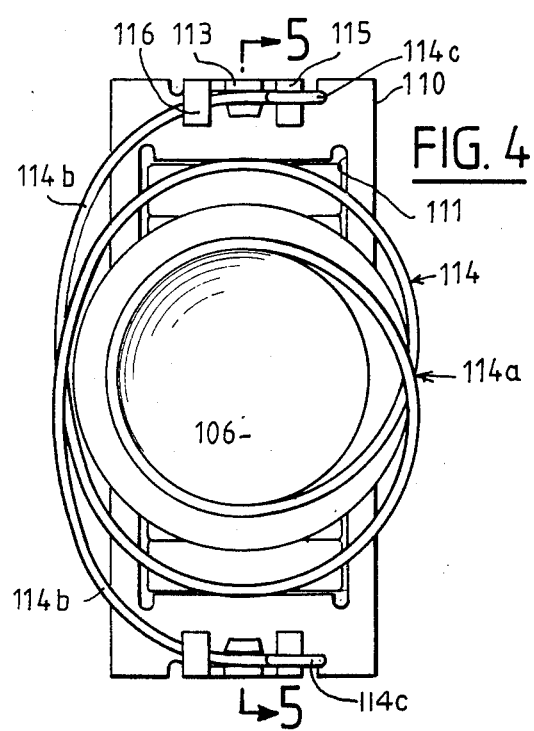
FIG. 4 is an elevational view of a sub-assembly constituting a modification.
Figure 5:
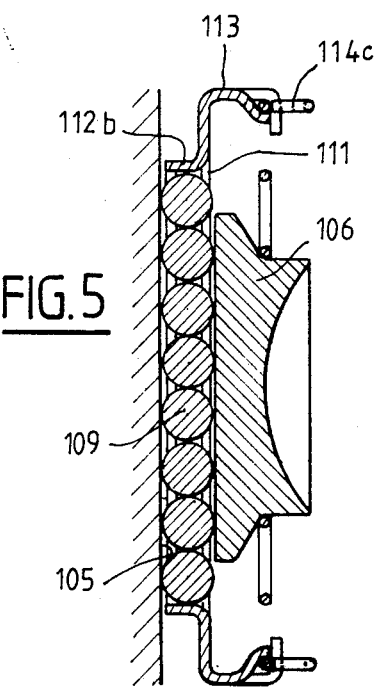
FIG. 5 is a sectional view taken along line 5—5 of FIG. 4.

In the embodiment shown in FIGS. 4 to 6, the elements corresponding to those of FIGS. 1 to 3 are designated by the same reference numerals to which 100 is added. The spring 114 has a mean plane parallel to the planar raceway 105 and comprises two coils which have been shown in a very diagrammatic manner, it being understood that the offset between these two coils is in fact much smaller than that shown in the drawings. The ends 114c of this spring are hooked to an assembly formed by a central lug 113 which, as in the preceding embodiment, also acts as an end-of-travel stop for the slide, and lateral tabs 115, 116 disposed on each side of this lug. Hooked on one of these tabs is the adjacent end of the spring, while the other tab overlaps the spring and serves to maintain the spring in its plane.

This arrangement having two coils enables the diameter of the wire to be increased while reducing the stress to a value which is compatible with the mechanical characteristic of this wire for a desirable value of the resilient return force.

It will however be understood that a larger number of coils than those illustrated may be chosen.

Further, the use of a wire having a flat section may also be contemplated without departing from the scope of the invention defined in the appended claims.

What is claimed is:

1. An arrangement comprising a planar raceway and a slide which are capable of undergoing a reciprocating motion with respect to each other in directions parallel to said raceway, rolling members between the raceway and slide, a cage generally parallel to said raceway and having ends on opposite sides of said slide, said cage maintaining the rolling members in position, and spring means connected between only said slide and said cage for maintaining said slide centrally disposed relative to said cage, said spring means consisting of a return spring having a substantially flat configuration having a mean plane parallel to said raceway and comprising a wire of resilient metal defining at least one coil surrounding said slide and two end arm portions which extend from said coil to ends remote from said coil, and connecting means for connecting said end arm portions to respective ends of said cage.

2. An arrangement according to claim 1, wherein the spring is subjected to bending and compressive stress in said mean plane.

3. An arrangement according to claim 1, wherein the spring has a plurality of said coils in contact with each other and said end arm portions extend in opposite directions away from the coils.

4. An arrangement according to claim 1, wherein said connecting means are hooking means.

5. An arrangement according to claim 1, wherein said connecting means comprise two lugs rigid with the cage with which lugs said ends of said arm portions are engaged, said lugs being spaced from but are cooperative with said slide and also act as end-of-travel stops limiting relative sliding motion between the cage and said slide.

6. A homokinetic universal joint of the tripod type comprising a tripod element carrying trunnion means, a barrel defining two planar raceways for each trunnion means, and an arrangement interposed between each trunnion means and each respective planar raceway and comprising a slide capable of sliding relative to the respective raceway in a direction parallel to said raceway, rolling members interposed between said raceway and said slide, a cage generally parallel to said raceway and having ends on opposite sides of said slide, said cage maintaining said rolling members in position, and spring means connected between only said slide and said cage for maintaining said slide centrally disposed relative to said cage, said spring means consisting of a return spring having a substantially flat configuration having a mean plane parallel to said raceway and comprising a wire of resilient metal defining at least one coil surrounding said slide and two end arm portions which extend from said coil to ends remote from said coil, and connecting means for connecting said end arm portions to respective ends of said cage.

7. A homokinetic universal joint according to claim 6, wherein each of said slides has a substantially cylindrical portion having an axis perpendicular to said planar raceway and said coil extends around said cylindrical portion.

* * * * *